US012568094B2

(12) United States Patent
Afonin

(10) Patent No.: US 12,568,094 B2
(45) Date of Patent: Mar. 3, 2026

(54) COMPUTING DEVICE AND METHOD OF DETECTING COMPROMISED NETWORK DEVICES

(71) Applicant: GROUP-IB GLOBAL PRIVATE LIMITED, Singapore (SG)

(72) Inventor: Anton Victorovich Afonin, Moscow (RU)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 632 days.

(21) Appl. No.: 17/864,551

(22) Filed: Jul. 14, 2022

(65) Prior Publication Data

US 2023/0056625 A1 Feb. 23, 2023

(30) Foreign Application Priority Data

Aug. 19, 2021 (RU) ................................ 2021124547

(51) Int. Cl.
| | |
|---|---|
| *H04L 29/06* | (2006.01) |
| *H04L 9/40* | (2022.01) |
| *H04L 61/4511* | (2022.01) |

(52) U.S. Cl.
CPC ...... *H04L 63/1416* (2013.01); *H04L 61/4511* (2022.05); *H04L 63/0236* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 7,225,343 | B1 | 5/2007 | Honig et al. |
| 7,496,628 | B2 | 2/2009 | Arnold et al. |

(Continued)

FOREIGN PATENT DOCUMENTS

| | | |
|---|---|---|
| CN | 103491205 A | 1/2014 |
| CN | 104504307 A | 4/2015 |

(Continued)

OTHER PUBLICATIONS

English Translation of CN106713312, @Questel—FAMPAT, Jul. 17, 2019.

(Continued)

*Primary Examiner* — Bryan F Wright
*Assistant Examiner* — Hassan A Hussein
(74) *Attorney, Agent, or Firm* — BCF LLP

(57) ABSTRACT

A method and a computing device for identifying, in a network infrastructure, network devices compromised by DNS tunneling are provided. The method comprises: receiving a portion of traffic of the network infrastructure; identifying, from the traffic, a plurality of DNS queries having been generated by network devices of the network infrastructure; generating, by the processor, for a given one of the plurality of DNS queries, a respective set of feature; applying, by the processor, to the respective set of features, a pre-trained decision rule; in response to the pre-trained decision rule rendering a positive outcome, increasing a penalty score for a respective network device of the network infrastructure having transmitted the given one of the plurality of DNS queries; and in response to the penalty score associated with the respective network device exceeding a predetermined penalty score threshold, identifying the respective network device as being compromised.

13 Claims, 3 Drawing Sheets

(56) References Cited

U.S. PATENT DOCUMENTS

| | | | |
|---|---|---|---|
| 7,712,136 B2 | 5/2010 | Sprosts et al. |
| 7,730,040 B2 | 6/2010 | Reasor et al. |
| 7,854,001 B1 | 12/2010 | Chen et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,219,549 B2 | 7/2012 | Gao et al. |
| 8,255,532 B2 | 8/2012 | Smith-Mickelson et al. |
| 8,260,914 B1 | 9/2012 | Ranjan |
| 8,266,695 B1 | 9/2012 | Clay |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,578,480 B2 | 11/2013 | Judge et al. |
| 8,600,993 B1 | 12/2013 | Gupta et al. |
| 8,612,463 B2 | 12/2013 | Brdiczka et al. |
| 8,612,560 B2 | 12/2013 | Oliver et al. |
| 8,625,033 B1 | 1/2014 | Marwood et al. |
| 8,631,489 B2 | 1/2014 | Antonakakis et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,762,537 B2 | 6/2014 | Alperovitch et al. |
| 8,776,229 B1 | 7/2014 | Aziz |
| 8,850,571 B2 | 9/2014 | Staniford et al. |
| 8,856,239 B1 | 10/2014 | Oliver et al. |
| 8,856,937 B1 | 10/2014 | Wüest et al. |
| 8,898,787 B2 | 11/2014 | Thompson et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,100,335 B2 | 8/2015 | Oliver et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,300,686 B2 | 3/2016 | Pidathala et al. |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,584,541 B1 | 2/2017 | Weinstein et al. |
| 9,654,593 B2 | 5/2017 | Garg et al. |
| 9,723,344 B1 | 8/2017 | Granström et al. |
| 9,736,178 B1 | 8/2017 | Ashley |
| 9,749,336 B1 | 8/2017 | Zhang et al. |
| 9,847,973 B1 | 12/2017 | Jakobsson et al. |
| 9,875,355 B1 | 1/2018 | Williams |
| 9,888,019 B1 | 2/2018 | Pidathala et al. |
| 9,917,852 B1 | 3/2018 | Xu et al. |
| 9,934,376 B1 | 4/2018 | Ismael |
| 10,044,748 B2 | 8/2018 | Dagon et al. |
| 10,129,194 B1 | 11/2018 | Jakobsson |
| 10,270,744 B2 | 4/2019 | Yu et al. |
| 10,587,646 B2 | 3/2020 | Fakeri-Tabrizi et al. |
| 10,715,543 B2 * | 7/2020 | Jakobsson ........... H04L 63/1433 |
| 11,012,414 B2 * | 5/2021 | Moore .................... H04L 63/20 |
| 11,153,330 B1 * | 10/2021 | Antoniewicz ....... H04L 61/4511 |
| 12,381,901 B1 * | 8/2025 | Golden .................. H04L 63/10 |
| 2002/0161862 A1 | 10/2002 | Horvitz |
| 2003/0009696 A1 | 1/2003 | Bunker et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2009/0138342 A1 | 5/2009 | Otto et al. |

| | | | |
|---|---|---|---|
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0095377 A1 | 4/2010 | Krywaniuk |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0209987 A1 | 8/2012 | Rhinelander et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0181975 A1 | 6/2014 | Spernow et al. |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127907 A1 | 5/2016 | Baxley et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0294862 A1 | 10/2016 | Tao |
| 2016/0306974 A1 | 10/2016 | Turgeman et al. |
| 2016/0352772 A1 | 12/2016 | O'Connor |
| 2016/0359679 A1 | 12/2016 | Parandehgheibi et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0257391 A9 * | 9/2017 | Emigh ................ H04L 63/1441 |
| 2017/0272471 A1 | 9/2017 | Veeramachaneni et al. |
| 2017/0279818 A1 | 9/2017 | Milazzo et al. |
| 2017/0279846 A1 * | 9/2017 | Osterweil ........... H04L 63/1425 |
| 2017/0286544 A1 | 10/2017 | Hunt et al. |
| 2017/0289187 A1 | 10/2017 | Noel et al. |
| 2017/0295157 A1 | 10/2017 | Chavez et al. |

(56) References Cited

U.S. PATENT DOCUMENTS

| | | |
|---|---|---|
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0007070 A1 | 1/2018 | Kulkarni et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |
| 2018/0115573 A1 | 4/2018 | Kuo et al. |
| 2018/0137150 A1 | 5/2018 | Osesina et al. |
| 2018/0227324 A1* | 8/2018 | Chambers ........... H04W 12/128 |
| 2018/0268464 A1* | 9/2018 | Li ...................... G06Q 30/0635 |
| 2018/0307832 A1* | 10/2018 | Ijiro ....................... G06F 21/577 |
| 2018/0309787 A1* | 10/2018 | Evron ...................... G06F 11/00 |
| 2019/0089737 A1* | 3/2019 | Shayevitz ........... H04L 63/1425 |
| 2019/0207973 A1 | 7/2019 | Peng |
| 2019/0222589 A1* | 7/2019 | Kislitsin ............. H04L 63/0236 |
| 2019/0373005 A1 | 12/2019 | Bassett |
| 2020/0007502 A1* | 1/2020 | Everton ................ H04L 51/063 |
| 2020/0092326 A1* | 3/2020 | Prakash ................... G06F 21/44 |
| 2020/0106809 A1* | 4/2020 | Raj ........................ H04L 63/168 |
| 2020/0134702 A1 | 4/2020 | Li |
| 2020/0145435 A1* | 5/2020 | Chiu ........................ H04L 67/02 |
| 2020/0169570 A1* | 5/2020 | Kleymenov ........ H04L 63/1416 |
| 2020/0349430 A1* | 11/2020 | Schmidtler .............. G06N 5/02 |
| 2020/0351244 A1* | 11/2020 | Moore ................... H04L 63/20 |
| 2021/0126901 A1* | 4/2021 | Rodriguez ............ G06N 20/20 |
| 2021/0174199 A1* | 6/2021 | Manadhata .......... G06N 3/0442 |
| 2021/0194879 A1* | 6/2021 | Meaburn ................. H04L 63/20 |
| 2021/0400080 A1* | 12/2021 | Kaidi ..................... G06N 5/025 |
| 2022/0058483 A1* | 2/2022 | Liu ...................... G06N 3/0464 |

FOREIGN PATENT DOCUMENTS

| | | |
|---|---|---|
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2668710 C1 | 10/2018 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

English Translation of CN105897714, @Questel—FAMPAT, Jul. 17, 2019.
English Translation of CN106506435, @Questel—FAMPAT, Jul. 26, 2019.
English Translation of CN107392456, @Questel—FAMPAT, Jul. 29, 2019.
English Translation of CN103491205, @Questel—FAMPAT, Jul. 29, 2019.
English Translation of CN106131016, @Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 16, 2019.
English Abstract of KR10-1514984 retrieved on Espacenet on Oct. 15, 2019.
Office Action with regard to the counterpart U.S. Appl. No. 15/707,641 mailed Apr. 25, 2019.
European Search Report with regard to the counterpart EP Patent Application No. EP17210904 completed May 16, 2018.
Office Action with regard to the counterpart U.S. Appl. No. 16/261,854 mailed Oct. 21, 2019.
Notice of Allowance with regard to the counterpart U.S. Appl. No. 15/707,641 mailed Oct. 30, 2019.
Whyte, "DNS-based Detection of Scanning Worms in an Enterprise Network", Aug. 2004, NOSS, pp. 1-17 (Year: 2005)—cited in the Notice of Allowance with regard to the counterpart U.S. Appl. No. 15/707,641.
Office Action with regard to the counterpart U.S. Appl. No. 15/858,013 mailed Nov. 22, 2019.
Search Report with regard to the counterpart SG Patent Application No. 10201900062S mailed Dec. 5, 2019.
Search Report with regard to the counterpart SG Patent Application No. 10201900060Y mailed Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 mailed Apr. 6, 2020.
Notice of Allowance with regard to the counterpart U.S. Appl. No. 15/858,013 mailed May 8, 2020.
Office Action with regard to the counterpart U.S. Appl. No. 16/270,341 mailed May 27, 2020.
Notice of Allowance with regard to the counterpart U.S. Appl. No. 15/858,013 mailed Jun. 10, 2020.
Notice of Allowance with regard to the counterpart U.S. Appl. No. 15/858,032 mailed Jul. 30, 2020.
Office Action with regard to the counterpart U.S. Appl. No. 16/659,697 mailed May 12, 2021.
Office Action with regard to the counterpart U.S. Appl. No. 16/247,870 mailed Jun. 29, 2021.
Office Action with regard to the counterpart U.S. Appl. No. 16/659,687 mailed Mar. 16, 2022.
Notice of Allowance with regard to the counterpart U.S. Appl. No. 16/659,687 mailed Jun. 24, 2022.

(56)            References Cited

OTHER PUBLICATIONS

Search Report with regard to the NL Patent Application No. 2031253 completed Jan. 2, 2023.

English Abstract of RU107616 retrieved on Espacenet on Jul. 3, 2017.

European Search Report with regard to EP17180099 completed on Nov. 28, 2017.

European Search Report with regard to EP17191900 completed on Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, p.p. 210-218.

Wikipedia, "Blockchain", https://en.wikipedia.org/wiki/Blockchain, pdf document, 18 pages.

Search Report with regard to the counterpart RU Patent Application No. 2018101764 completed Jun. 29, 2018.

Search Report with regard to the counterpart RU Patent Application No. 2018101761 completed Jun. 20, 2018.

International Search Report with regard to the counterpart Patent Application No. PCT/RU2016/000526 mailed Jun. 1, 2017.

Search Report with regard to the counterpart RU Patent Application No. 2018101760 completed Jun. 22, 2018.

Search Report with regard to the counterpart RU Patent Application No. 2018101759 completed Sep. 7, 2018.

English Abstract of RU129279 retrieved on Espacenet on Sep. 11, 2017.

English Abstract of RU164629 retrieved on Espacenet on Sep. 11, 2017.

English Abstract of RU2538292 retrieved on Espacenet on Sep. 18, 2017.

Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.

Search Report with regard to the counterpart Patent Application No. RU2018105377 completed Oct. 15, 2018.

Search Report with regard to the counterpart RU Patent Application No. 2018101763 completed Jan. 11, 2019.

Search Report with regard to the counterpart RU Patent Application No. 2016137336 completed Jun. 6, 2017.

English Abstract of RU2522019 retrieved on Espacenet on Jan. 25, 2019.

Search Report with regard to the counterpart RU Patent Application No. 2017140501 completed Jul. 11, 2018.

European Search Report with regard to the counterpart EP Patent Application No. EP17211131 completed Apr. 12, 2018.

* cited by examiner

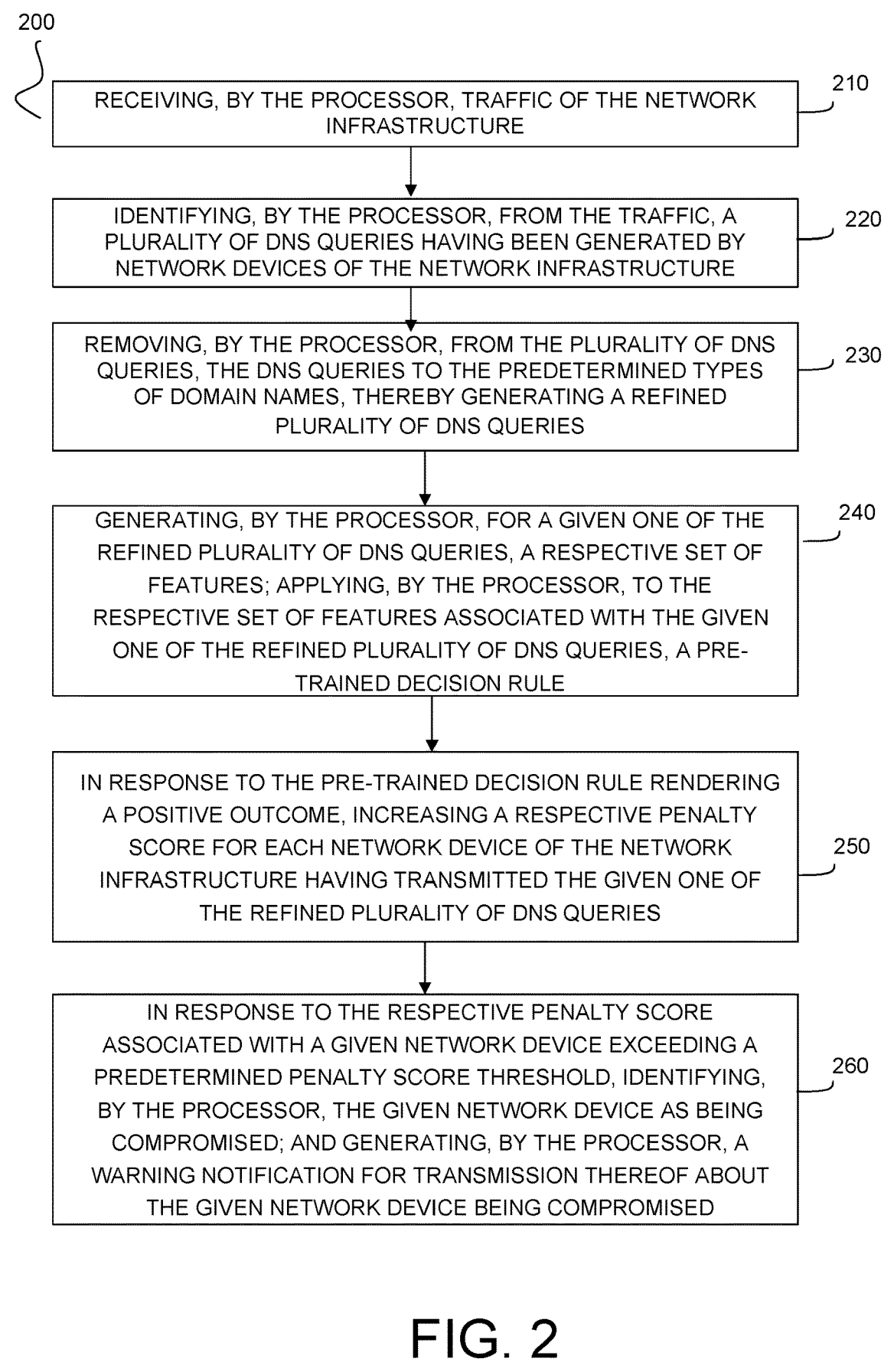

200

RECEIVING, BY THE PROCESSOR, TRAFFIC OF THE NETWORK INFRASTRUCTURE      210

IDENTIFYING, BY THE PROCESSOR, FROM THE TRAFFIC, A PLURALITY OF DNS QUERIES HAVING BEEN GENERATED BY NETWORK DEVICES OF THE NETWORK INFRASTRUCTURE      220

REMOVING, BY THE PROCESSOR, FROM THE PLURALITY OF DNS QUERIES, THE DNS QUERIES TO THE PREDETERMINED TYPES OF DOMAIN NAMES, THEREBY GENERATING A REFINED PLURALITY OF DNS QUERIES      230

GENERATING, BY THE PROCESSOR, FOR A GIVEN ONE OF THE REFINED PLURALITY OF DNS QUERIES, A RESPECTIVE SET OF FEATURES; APPLYING, BY THE PROCESSOR, TO THE RESPECTIVE SET OF FEATURES ASSOCIATED WITH THE GIVEN ONE OF THE REFINED PLURALITY OF DNS QUERIES, A PRE-TRAINED DECISION RULE      240

IN RESPONSE TO THE PRE-TRAINED DECISION RULE RENDERING A POSITIVE OUTCOME, INCREASING A RESPECTIVE PENALTY SCORE FOR EACH NETWORK DEVICE OF THE NETWORK INFRASTRUCTURE HAVING TRANSMITTED THE GIVEN ONE OF THE REFINED PLURALITY OF DNS QUERIES      250

IN RESPONSE TO THE RESPECTIVE PENALTY SCORE ASSOCIATED WITH A GIVEN NETWORK DEVICE EXCEEDING A PREDETERMINED PENALTY SCORE THRESHOLD, IDENTIFYING, BY THE PROCESSOR, THE GIVEN NETWORK DEVICE AS BEING COMPROMISED; AND GENERATING, BY THE PROCESSOR, A WARNING NOTIFICATION FOR TRANSMISSION THEREOF ABOUT THE GIVEN NETWORK DEVICE BEING COMPROMISED      260

FIG. 2

COMPUTING DEVICE AND METHOD OF DETECTING COMPROMISED NETWORK DEVICES

CROSS REFERENCE

The present application claims priority to a Russian Patent Application No.: 2021124547, filed on Aug. 19, 2021, entitled "COMPUTING DEVICE AND METHOD OF DETECTING COMPROMISED NETWORK DEVICES BASED ON DNS TUNNELING DETECTION", the content of which is incorporated herein by reference in its entirety.

FIELD

The present technology relates broadly to the field of cybersecurity; and, in particular, to a computer-implementable method and a computing device for detecting compromised devices that are using DNS tunneling.

BACKGROUND

DNS tunneling is one of common methods of exchanging information with a compromised device over the Internet used by intruders. This term usually means a method of information exchange, where a given message is transmitted by a standard DNS query under the guise of a domain name of a third or higher level, for example, extremely_hidden_secret_message.domain.com.

Typically, the given message is being encrypted prior to sending it, therefore, a domain name common for the DNS tunneling usually looks as follows: MV4HI4TFNVSWY6K7NBUWIZDFNZPXGZLDOISXI-X3NMVZXGYLHMU=====.domai n.com.

The mere fact of DNS tunnel availability in the network infrastructure outbound traffic can usually be interpreted as an indication that at least one device of this infrastructure is compromised.

Generally, there are two approaches used in the prior art to detect compromised network devices that are using DNS tunneling, which can be determined as based on traffic volume analysis and payload analysis.

In the first case, when analyzing the traffic volume, a total number of queries to a particular domain can be determined and this number is further compared to the average values. Since DNS tunneling is characterized by atypically large volume of DNS traffic, namely, tens and hundreds of times higher than typical values.

U.S. Pat. No. 10,044,748 B2, issued on Aug. 7, 2018, assigned to Georgia Tech Research Corp., and entitled "METHODS AND SYSTEMS FOR DETECTING COMPROMISED COMPUTERS", discloses a system and method for detecting a first network of compromised computers in a second network of computers, comprising: collecting Domain Name System (DNS) data for the second network; examining the collected data relative to DNS data from known comprised and/or uncompromised computers in the second network; and determining the existence of the first network and/or the identity of compromised computers in the second network based on the examination.

U.S. Pat. No. 10,587,646-B2, issued on Mar. 10, 2020, assigned to Akamai Technologies Inc, and entitled "ANALYZING DNS REQUESTS FOR ANOMALY DETECTION", discloses a computer-implemented method for detecting anomalies in DNS requests comprises receiving a plurality of DNS requests generated within a predetermined period. The predetermined period includes a plurality of DNS data fragments. The method further includes receiving a first DNS request and selecting a plurality of second DNS requests from the plurality of DNS requests such that each of the second DNS requests is a subset of the first DNS request. The method also includes calculating a count value for each of the DNS data fragments, where each of the count values represents a number of instances the second DNS requests appear within one of the DNS data fragments. In some embodiments, the count values for each of the DNS data fragments can be normalized. The method further includes determining an anomaly trend, for example, based on determining that at least one of the count values exceeds a predetermined threshold value.

However, for the systems implementing such approaches, sessions with small exchange volume may not be detected, when, for example, malicious software (malware) uses a DNS tunnel for secret sending the compromised user credentials to the command server, but not for downloading or uploading a file or other significant amount of information.

When analyzing the payload, attention is paid to anomalous queries, especially if they comprise atypical domain names, strange characters, etc. Most often, this approach uses various statistical techniques to detect unusually long domain names in queries.

U.S. Pat. No. 10,270,744-B2, issued on Apr. 23, 2019, assigned to Infoblox Inc., and entitled "BEHAVIOR ANALYSIS BASED DNS TUNNELING DETECTION AND CLASSIFICATION FRAMEWORK FOR NETWORK SECURITY", discloses techniques for a behavior analysis based on DNS tunneling detection and classification framework for network security. In some embodiments, a platform implementing an analytics framework for DNS security is provided for facilitating DNS tunneling detection. For example, an online platform can implement an analytics framework for DNS security based on passive DNS traffic analysis.

However, intruders are also familiar with this approach, and they may deliberately not use domain names of the maximum available length at DNS tunneling, that complicates detection.

Russian Patent No.: 2,668,710-C1, issued on Oct. 2, 2018, assigned to Group-IB TDS, and entitled "METHOD COMPUTING DEVICE FOR DETECTING MALICIOUS DOMAIN NAMES IN NETWORK TRAFFIC", discloses a method and computing device for detecting malicious domain names in network traffic. The method comprises: receiving the network traffic from a data network, extracting a plurality of data packets from the network traffic, analyzing the plurality of data packets in order to extract at least one domain name from the plurality of data packets; generating, for a given one of the at least one domain names, a given numerical value representative of a suspiciousness of the given one of the at least one domain name, the given numeric value being based on a given set of features of domain name suspiciousness corresponding to one of the given set of analysis methods; classifying the at least one domain name as malicious domain names, in response to an analysis being indicative the given domain name being a malicious domain name.

Thus, there is a need to develop technical solutions that would enable to detect compromised devices of the network infrastructure even with small volumes of data exchange and at DNS tunneling with deliberately "harmless" domain name length.

SUMMARY

It is an object of the present technology to ameliorate at least some of the inconveniences associated with the prior art.

The developers of the present technology have devices methods and systems of determining a decision rule, such as by training a neural network, to identify malicious DNS queries, and further identify compromised network devices having sent such malicious DNS queries. This approach allows improving the accuracy of detecting compromised network devices that are using DNS tunneling.

More specifically, in accordance with a first broad aspect of the present technology, there is provided a computer-implementable method of identifying, in a network infrastructure, compromised network devices that are using DNS tunneling. The method is executable by a computing device including a processor communicatively coupled to the network infrastructure. The method comprises: receiving, by the processor, traffic of the network infrastructure; identifying, by the processor, from the traffic, a plurality of DNS queries having been generated by network devices of the network infrastructure; determining, by the processor, in the plurality of DNS queries, presence of DNS queries to predetermined types of domain names, generation of which, by a respective network device of the network infrastructure, is non-indicative of the respective network devices being compromised; removing, by the processor, from the plurality of DNS queries, the DNS queries to the predetermined types of domain names, thereby generating a refined plurality of DNS queries; generating, by the processor, for a given one of the refined plurality of DNS queries, a respective set of feature; applying, by the processor, to the respective set of features associated with the given one of the refined plurality of DNS queries, a pre-trained decision rule, the pre-trained decision rule having been trained to determine, based on the respective set of features, whether a respective domain name associated with the given one of the refined plurality of DNS queries is malicious; in response to the pre-trained decision rule rendering a positive outcome, increasing a respective penalty score for each network device of the network infrastructure having transmitted the given one of the refined plurality of DNS queries; in response to the respective penalty score associated with a given network device exceeding a predetermined penalty score threshold, identifying, by the processor, the given network device as being compromised; and generating, by the processor, a warning notification for transmission thereof about the given network device being compromised.

In some implementation of the method, the traffic of the network infrastructure comprises at least one of inbound traffic and outbound traffic.

In some implementation of the method, the receiving the traffic comprises applying, by the processor, a traffic mirroring approach.

In some implementation of the method, the determining, in the plurality of DNS queries, the presence of the DNS queries to the predetermined types of domain names comprises determining, for each one of the plurality of DNS queries, at least one of: a domain name; a sender IP address, and a recipient IP address.

In some implementation of the method, the method further comprises determining whether at least one recipient IP address is in one of a blacklist and in a whitelist, and in response to the at least one recipient IP address being in the blacklist, increasing the penalty score for each network device of the network infrastructure having transmitted a respective DNS query including the at least one recipient IP address; in response to at least one recipient IP address being in the whitelist, identifying the respective DNS query as being one of the DNS queries to the predetermined types of domain names.

In some implementation of the method, the predetermined types of domain names of the DNS queries to the predetermined types of domain names include at least one of:

second level domain names, low entropy domain names, and domain names having been identified as trusted domain names.

In some implementation of the method, the pre-trained decision rule comprises at least one of (i) a heuristic rule and (ii) a long short-term memory (LSTM) neural network-based rule, the LSTM neural network-based rule having been determined by a LSTM neural network trained to determine, based on the respective set of features, whether the respective domain name associated with the given one of the refined plurality of DNS queries is malicious.

In some implementation of the method, applying the heuristic rule comprises: determining, by the processor, for the respective domain name of the given one of the refined plurality of DNS queries, a respective entropy value; and in response to the respective entropy value being greater than a predetermined entropy value threshold, determining that the respective domain name associated with the given one of the refined plurality of DNS queries is malicious.

In some implementation of the method, applying the heuristic rule comprises: determining, by the processor, a respective frequency of occurrence, in the respective domain name, of each one of a plurality of predetermined N-grams; based on respective frequency values, determining an N-gram entropy value for the respective domain name; and in response to the N-gram entropy value exceeding a predetermined N-gram entropy threshold value, determining that the respective domain name associated with the given one of the refined plurality of DNS queries is malicious.

In some implementation of the method, the LSTM neural network-based rule comprises feeding, by the processor, to the LSTM neural network: (i) the respective set of features associated with the given one of the refined plurality of DNS queries; (ii) statistics of network interactions of the respective network device having transmitted the given one of the refined lit of DNS queries, the statistics of network interactions having been determined for a last threshold time; and (iii) a current penalty score of the respective network device.

In some implementation of the method, in response to the pre-trained decision rule rendering the positive outcome, the method further comprises: determining, by the processor, in past traffic of the network infrastructure, whether there is at least one other network device having transmitted a DNS query including the respective domain name of the given one of the refined plurality of DNS queries; in response to determining the at least one other network device, executing one of: increasing the respective penalty score of the at least one other network device; and increasing respective penalty scores of each network device of the network infrastructure.

In some implementation of the method, in response to the pre-trained decision rule rendering the positive outcome, the method further comprises: restricting, by the processor, access to the respective domain name of the given one of the refined plurality of DNS queries, for every network device included into the network infrastructure; generating, by the processor, a notification of the respective domain name being malicious; generating, by the processor, a template email for notifying interested parties about the respective domain name being malicious; and adding the respective domain name to a blacklist of domain names.

In accordance with a second broad aspect of the present technology, there is provided a computing device for identifying, in a network infrastructure, compromised network devices that are using DNS tunneling. The computing device comprises a processor communicatively coupled to the network infrastructure and a non-transitory computer-readable memory storing instructions. The processor, upon executing the instructions, is configured to: receive traffic of the network infrastructure; identify, from the traffic, a plurality of DNS queries having been generated by network devices of the network infrastructure; determine, in the plurality of DNS queries, presence of DNS queries to predetermined types of domain names, generation of which, by a respective network device of the network infrastructure, is non-indicative of the respective network devices being compromised; remove, from the plurality of DNS queries, the DNS queries to the predetermined types of domain names, thereby generating a refined plurality of DNS queries; generate, for a given one of the refined plurality of DNS queries, a respective set of feature; apply, to the respective set of features associated with the given one of the refined plurality of DNS queries, a pre-trained decision rule, the pre-trained decision rule having been trained to determine, based on the respective set of features, whether a respective domain name associated with the given one of the refined plurality of DNS queries is malicious; in response to the pre-trained decision rule rendering a positive outcome, increase a respective penalty score for each network device of the network infrastructure having transmitted the given one of the refined plurality of DNS queries; in response to the respective penalty score associated with a given network device exceeding a predetermined penalty score threshold, identify the given network device as being compromised; and generate a warning notification for transmission thereof about the given network device being compromised.

In the context of the present specification, the term "network resources" denotes computing devices, i.e., software and hardware complexes configured to exchange data within a computer network, for example, the Internet, and located within the network infrastructure. In a particular example, a given network resource, in terms of this application, could be a workstation connected to a local area network. Also, the given network resource could be a laptop, netbook, tablet, smartphone, Internet of Things (IoT) device, server, router, firewall, or, without limitation, any other software and hardware solution that meets the above criteria.

In the context of the present specification, the term "network infrastructure" denotes a set of software and hardware creating the basis for effective data communication, which could be targeted by malefactors. This could be, for example, a corporate computer network containing servers, workstations, routers, etc.

Further, in the context of the present specification, DNS tunneling refers to a technique that enables transmission of arbitrary traffic over the DNS protocol. In order to arrange a DNS tunnel, someone is required to receive it outside (i.e., at the point where the tunnel is directed to). The receiving point is the name server for a particular zone. From the inside the network name queries are made for this zone; this is the way the traffic is transmitted from the inside the network infrastructure. As a result of transformation, response data are returned—this is the way the traffic is transmitted inside the network. DNS tunneling cannot be prevented by simple firewall rules while allowing other DNS traffic. This is due to the fact that DNS tunnel traffic and legitimate DNS queries are indistinguishable.

Further, in the context of the present specification, the term "penalty" means a cumulative assessment of the device maliciousness and/or compromise for a certain period of time.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where:

FIG. 2 depicts a flowchart diagram of a method of identifying compromised network devices based on DNS tunneling, in accordance with certain non-limiting embodiments of the present technology.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Non-limiting embodiments of the present technology are directed to a computer-implementable method and system for identifying compromised network devices that are using DNS tunneling.

System

Figure 1:
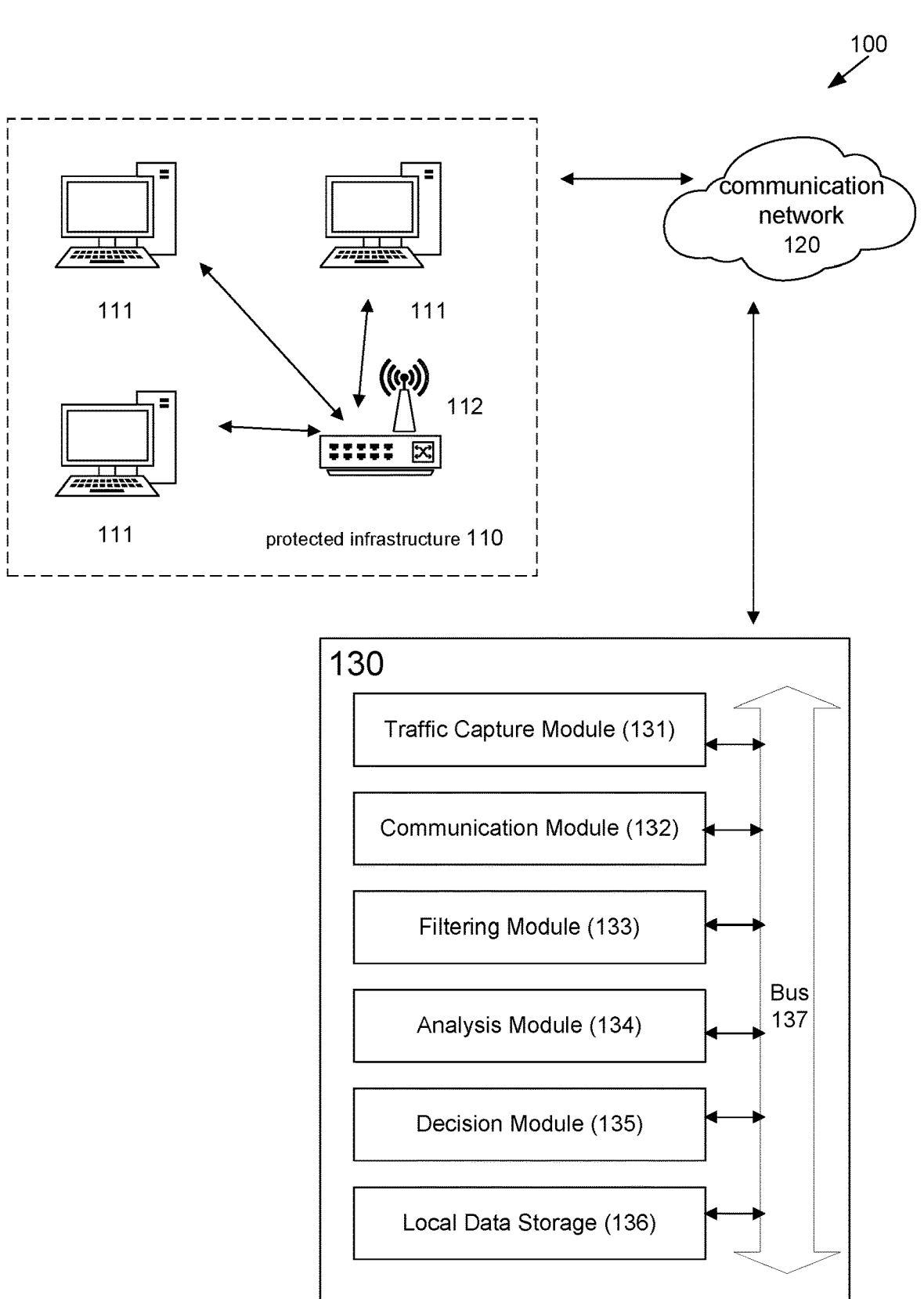
FIG. 1 depicts a schematic diagram of a system for identifying compromised network devices that are using on DNS tunneling, in accordance with certain non-limiting embodiments of the present technology.

With reference to FIG. 1, there is depicted a schematic diagram of a system 100 for identifying compromised network devices, in accordance with certain non-limiting embodiments of the present technology. In some non-limiting embodiments of the present technology, the system 100 comprises at least one of: a protected network infrastructure 110, a communication network 120, and a computing device 130 communicatively coupled, via the communication network 120, to the protected network infrastructure 110, and configured for detection of compromised network devices based on DNS tunneling detection.

In some non-limiting embodiments of the present technology, the communication network 120 can be the Internet. In alternative non-limiting embodiments of the present technology, the communication network 120 can be implemented as any suitable local area network (LAN), wide area network (WAN), a private communication network, or the like. It should be expressly understood that implementations for the communication network 120 are for illustration purposes only. How a respective communication link (not separately numbered) between each component of the protected network infrastructure 110, the computing device 130, and the communication network 120 is implemented will depend, inter alia, on how each of these computing devices is implemented. Merely as an example and not as a limitation, in those embodiments of the present technology where the internal computing device 130 is implemented as a wireless communication device such as the smartphone, the communication link can be implemented as a wireless communication link. Examples of wireless communication links include, but are not limited to, a 3G communication network link, a 4G communication network link, and the like. The communication network 120 may also use a wireless connection with the computing device 130.

The computing device 130 can be communicatively coupled with a network switch 112 (also referred to herein as "traffic capture devices") of the protected network infrastructure 110 to receive traffic therefrom via the communication network 120, and is configured to further process the received network traffic to detect malicious domain names used for connection between a compromised, such as infected with a piece of malware, workstation or an infected computer and the managing command center with subsequent receiving control commands from it to execute a set of programmed malicious actions.

Further, according to certain non-limiting embodiments of the present technology, the protected network infrastructure 110 comprises at least one user device 111, the network switch 112, which is configured to transmit (relay) all traffic of the protected network infrastructure 110.

In the system 100, shown in FIG. 1, the computing device 130 can be communicatively coupled to the network switch 112 by a wire connection, for example, a network cable, or wirelessly, and is at least one of the following known network devices for capturing and transmitting network traffic: L2 level network switches using the technique of traffic mirroring of necessary network segments, such as, for example, SPAN traffic mirroring technique implemented in CISCO network equipment, network transparency tools, also called Security Delivery Platforms or Network Packet Brokers (NPB), and Test Access Points of various types, and also ICAP protocol-supported proxy servers operating within an established TCP connection, SMTP protocol-supported mail servers, etc.

In some non-limiting embodiments of the present technology, the computing device 130 could be implemented as part of the communication network 120 or coupled directly to the communication network 120. According to certain non-limiting embodiments of the present technology, the computing device 130 can be configured to extract or capture the network traffic from communication network 120 for further analysis and processing to detect malicious domain names in the captured network traffic. In other words, in these embodiments, the computing device 130 could have the functionality of the above-described traffic capture devices. In other non-limiting embodiments of the present technology, the computing device 130, if necessary, could use a secure data transmission/reception link to receive network traffic retrieved from the communication network 120.

In additional non-limiting embodiments of the present technology, the network traffic capture devices, such as the network switch 112 could be embedded or integrated into the computing device 130.

Further, according to certain non-limiting embodiments of the present technology, the computing device 130 can be implemented as a combination of software and hardware system and comprise a traffic capture module 131, communication module 132, a filtering module 133, an analysis module 134, a decision module 135 and a local data storage 136. Each of the above modules can be coupled to a communication bus 137, while each of the traffic capture module 131, the communication module 132, the filtering module 133, the analysis module 134, and the decision module 135 is configured to exchange data with the local data storage 136 via the communication bus 137, where the traffic capture module 131 is configured to exchange data via the communication bus 137, and the communication module 132 is also configured to exchange data via the communication bus 137 with the filtering module 133, which in turn, is configured to exchange data via the communication bus 137 with the analysis module 134, and the analysis module 134 is communicatively connected with the decision module 135 via the communication bus 137.

According to certain non-limiting embodiments of the present technology, the local data storage 136 is configured for storing executable program instructions, which could control operation of the traffic capture module 131, the communication module 132, the filtering module 133, the analysis module 134, and the decision module 135. Besides, the local data storage 136 is used in the computing device 130 for storing different data used at operation of the computing device 130.

For example, the local data storage 136 can be configured to store data on the analytical reports available, each of which is associated with a specific domain name, and each of which contains data on the numerical values of penalties assigned to the specific domain name by the analysis module 134. Also, the local data storage 136 can be configured to store data related to the decision generated by the decision module 135 in respect to the network device, from which malicious DNS queries have been sent.

The local data storage 136 also stores data on known domain names, blacklists and whitelists of domain names. It should also be noted that information about blacklists and whitelists in the additional embodiment could be received from external databases (not shown) via the communication network 120.

In additional non-limiting embodiments of the present technology, the local data storage 136 can also be configured to store data on each of the network devices in the protected network infrastructure 110, such as the at least one user device 111. Such data can include, without limitation, at least one of: statistics of network interactions of the at least one user device 111 in the protected network infrastructure 110 within T minutes, where the numerical value T is preselected, penalties of the at least one user device 111, and data on the components of the at least one user device 111.

In some non-limiting embodiments of the present technology, at least some of the above data stored in the local data storage 136 could be stored in a cloud storage (not shown), to which the computing device 130 can have access via the communication network 120. For example, the cloud storage can include a single remote file server communicatively coupled to the communication network 120 or to an other communication network, different from the communication network 120, as on a plurality of remote file servers distributed in the communication network 120 or to the other communication network different from the communication network 120.

In some non-limiting embodiments of the present technology, the computing device 130 could comprise a separate local analytical report storage (not shown) configured for storing data on available analytical reports. Such a separate local analytical report storage could be connected, via the communication bus 137, to the filtering module 133, enabling the filtering module 133 to access this local analytical report storage to obtain data on available analytical reports from it, and also be connected, via the communication bus 137, with the decision module 135, which can further be connected to the local analytical report storage for storing a new analytical report to it, which will be described in more detail below.

In the computing device 130 of the system 100 shown in FIG. 1, the communication module 132 is wired, for example, using a coaxial cable, twisted pair, fiber optic cable, or other physical connection, to one of the network switch 112 of the protected network infrastructure 110 and the traffic capture module 131 to receive network traffic from the protected network infrastructure 110. However, wireless communication links between the computing device 130 and the one of the network switch 112 and the traffic capture module 131, for example, a WiFi™-based communication link, a 3G™-based communication link, an LTE™-based communication link, etc., are also envisioned without departing from the scope of the present technology.

The communication module 132 in the computing device 130, according to the present technology, could be implemented as a network adapter equipped with necessary connectors for connecting physical cables of the required types to them, depending on the types of physical connections used for communication with the one of the network switch 112 and the traffic capture module 131. In some non-limiting embodiments of the present technology, the communication module 132 in the computing device 130 could be implemented as at least one of WiFi™ adapter, 3G™ adapter, LTE™ adapter or other wireless adapter, depending on the type of wireless communication line used for communication with any external network devices and remote data storages to which the computing device 130 could be connected to exchange data therewith. Thus, the communication module 132 in the computing device 130 could be configured to receive input data from one or more network devices by wire and/or wirelessly, and also could be configured to send output data to the other network devices by wire and/or wirelessly.

In other non-limiting embodiments of the present technology, the communication module 132 could also be any other communication device, such as, without limitation, a transceiver, modem and/or network interface card for communicating with external network devices of any type via a wired or wireless communication network, for example, using Ethernet™ connection, digital subscriber line (DSL), telephone line, coaxial cable, cellular telephone system, etc. In some embodiments of the present technology, the network traffic received by the communications module 132 could be at least temporarily stored in the local data storage 136. In yet other non-limiting embodiments of the present technology, the network traffic received by the communication module 132 could be at least temporarily stored in a separate local network traffic storage (not shown), different from the local data storage 136 and connected via the communication bus 137 to the communication module 132. In yet other embodiments of the present technology, the network traffic received by the communication module 132 could be at least temporarily stored in a separate remote network traffic storage (not shown), communicatively connected with the communication module 132 by wire and/or wirelessly.

Further, according to certain non-limiting embodiments of the present technology, the filtering module 133 is configured to connect or communicate, via the communications bus 137, to the communication module 132 so as to receive the captured network traffic therefrom. The filtering module 133 extracts a plurality of data packets, comprising DNS queries from the network traffic received, using, for example, certain techniques for extracting DNS queries in data packets, such as zeek, snort, Surikata, Bro, Kuko, and the like, including the use of improved techniques based on at least one of the above techniques. The filtering module 133 is also configured to analyze each of the plurality of the extracted data packets, so as to extract at least one domain name and sender and/or recipient IP addresses therefrom.

In those embodiments of the present technology, where the network traffic received is stored in the local data storage 136, the filtering module 133 could be configured to access the local data storage 136 or communicate with it via the communication bus 137, so as to extract the stored network traffic therefrom for subsequent retrieval of the plurality of data packets therefrom, as described above.

In those embodiments of the present technology, where the received network traffic is stored in the separate local network traffic storage (not shown), the filtering module 133 could be configured to access such local network traffic storage or communicate with it via the communication bus 137, so as to extract the stored network traffic therefrom for subsequent retrieval of the plurality of data packets, as described above. In those embodiments of the present technology, where the received network traffic is stored in the remote network traffic storage (not shown), the filtering module 133 could be configured to access the remote network traffic storage or communicate with it using the communication module 132 connected to the filtering module 133 via the communication bus 137, so as to extract the stored network traffic therefrom for subsequent retrieval of the plurality of data packets therefrom, as described above.

In some non-limiting embodiments of the present technology, after extracting domain names from the analyzed DNS queries, the filtering module 133 can be configured to additionally determine whether there is an analytical report for each of these domain names extracted.

In order to detect the availability of an analytical report already generated for a given domain name, the filtering module 133 performs at least the following operations: accessing the local data storage 136 or communicating with it via the communication bus 137, so as to receive data on the available analytical reports therefrom, where each of the reports is associated with a respective domain name, for which this analytical report has been generated; setting up a correspondence of each of the domain names extracted to one of the available analytical reports by executing character-by-character comparison of each of the extracted domain names with the domain names identifying the analytical reports in the specified received data. Thus, the filtering module 133 compares each domain name extracted with the domain names contained in the analytical reports received. Further, in response to a match between the domain name extracted with a domain name from one of the available analytical reports, the filtering module 133 can be configured to determine that there is already an analytical report stored in the local data storage 136 for the extracted domain name, that is indicative of the fact that the domain name extracted has already been previously analyzed in the computing device 130.

In those embodiments, where the analytical report data are stored in the local analytical report storage (not shown), the filtering module 133 accesses such local analytical report storage or communicates with it using the communication module 132 to obtain the data on the available analytical reports therefrom, where each of the reports is associated with the respective domain name, for which this analytical report has been generated, for further determining if there is a match between the domain name extracted and one of the available analytical reports.

Thus, the filtering module 133 enables filtering at least part of the domain names extracted from the data packets of the received network traffic using the minimum computing resources of the computing device 130, which may accelerate the process of detection of malicious domain names in the network traffic.

Further, according to certain non-limiting embodiments of the present technology, the filtering module 133 can be configured to transmit, to the analysis module 134, only those extracted domain names, for which there is no analytical report in the local data storage 136, that is, only those domain names that have not been previously analyzed in the computing device 130, in particular in its decision module 135.

According to certain non-limiting embodiments of the present technology, the analysis module 134 is configured to connect to the filtering module 133 or communicate with it via the communication bus 137, so as to obtain information therefrom, for example, information about domain names for which the filtering module 133 has detected the absence of an analytical report, as described above.

In those embodiments of the present technology, where the domain names extracted by the filtering module 133 are stored in the local data storage 136, the analysis module 134 accesses the local data storage 136 or communicates with it via the communication bus 137, so as to obtain the data on domain names therefrom for further analysis in this analysis module 134, as described below.

In other embodiments of the present technology, where the domain names extracted by the filtering module 133 are stored in the separate local data storage, the analysis module 134 accesses such local data storage or communicates with it via the communication bus 137 or via wireless communication link through the communication module 132, so as to obtain the data on domain names therefrom for further analysis in this analysis module 134, as described below.

Further, according to certain non-limiting embodiments of the present technology, the analysis module 134 can be configured to analyze each of the obtained domain names using a predetermined set of techniques or methods for analyzing suspiciousness, with assigning a predetermined penalty numerical value to each of the domain names obtained.

More specifically, the analysis module 134 can be configured to run a decision rule, on the basis of which a verdict is rendered with regard to maliciousness or safety of a given domain name with use of a set of suspiciousness features of this domain name. The result rendered by the decision rule can thus be indicative of the potential maliciousness of the device (such as the at least one user device 111) for the decision module 135. In some non-limiting embodiments of the present technology, the decision rule can be based on one of heuristic and statistical algorithms, and machine learning algorithms (MLA). An example of a heuristic rule could be a division of domains by the entropy level so that domains with high level of entropy are recognized as suspicious. More specifically, the analysis module 134 can be configured to determine domain names, which entropy level exceeds a predetermined threshold, as being suspicious. Approaches based on heuristic methods, for example, such as selecting n-grams and subsequent computing the domain name entropy, are also envisioned.

In those embodiments, where the decision rule is based on the MLA, it can be implemented based on a trained Long Short-Memory (LSTM) neural network (NN). According to certain non-limiting embodiments of the present technology, the LSTM NN can include a plurality of layers, where on a first layer, dimensionality of the feature space for the suspiciousness features associated with the given domain name is normalized and reduced. Further, on a first learning layer, the nodes include weights determined during training the LSTM . The next layer clears the results. After that, the LSTM NN includes two additional intermediate layers, and on the last one a binary verdict is rendered, indicative of whether the domain is suspicious or not.

In some non-limiting embodiments of the present technology, the analysis module 134 could be configured to run a set of decision rules, where each of the rules makes its own decision or renders its own verdict with regard to maliciousness or safety of the given domain name using one and the same set of suspiciousness features of this domain name. In some non-limiting embodiments of the present technology, the final verdict with regard to the domain name safety could be rendered by the analysis module 134. For example, in case, where at least one of the set of decision rules or all of the set of decision rules have rendered a verdict indicative of the safety of the given domain name, the analysis module 134 can be configured to render the final verdict indicative of the given domain name being safe. By contrast, if none of the set of decision rules has rendered a verdict indicative of the given domain name being safe, the analysis module 134 could render the final verdict indicative of the given domain name being maliciousness.

In other non-limiting embodiments of the present technology, the analysis module 134 could render its final verdict indicative of maliciousness or safety of the given domain name by comparing the total weight of individual verdicts generated by the set of decision rules, where a predetermined weighting factor is automatically assigned to any individual verdict rendered by each decision rule from the set. Thus, the analysis module 134 renders the final verdicts taking into account all intermediate verdicts having one or another weight in the total weight taken into account for rendering the final verdict.

In some non-limiting embodiments of the present technology, the analysis module 134 could be configured to run a special framework (software platform) that enables, for example, an operator or user of the computing device 130 to change the set of rules used for analyzing maliciousness of the given domain name including the heuristic rules and those based on the MLA mentioned above. Besides, this framework can be used to obtain data on the T time value, which determines the statistics of interaction of the at least one user device 111 and the protected network infrastructure 110.

After rendering the final verdict, the analysis module 134 prepares or generates a respective analytical report for the given domain name under investigation. For example, according to certain non-limiting embodiments of the present technology, the respective analytical report can include at least one of (1) the data from the corresponding log file created during the analysis for the given domain name, (2) also the data on the final verdict rendered by the analysis module 134 with respect to the given domain name, and (3) the data on the decision rule used by the analysis module 134 for rendering the final verdict. In some non-limiting embodiments of the present technology, where several decision rules are used, the analytical report prepared or generated by the analysis module 134 could also comprise the data on each of the decision rules used for rendering the final verdict, including respective verdicts of each one of the decision rules with regard to the given domain name.

In some non-limiting embodiments of the present technology, the analysis module 134 could be divided into several independent sub-modules, where each of the sub-modules could perform at least one of the above-described functionalities of the analysis module 134. Each one of such sub-modules can be configured to communicate with each other and the other structural modules of the computing device 130 via the communication bus 137. In this case, one of such sub-modules could be configured to create at least one log file, an other one could be configured to communicate with other sub-modules via, for example, the communication bus 137, so as to receive therefrom, for example, the data on a specific suspiciousness feature for the given domain name.

For the purpose of storing the prepared or generated analytical report in the local data storage 136, the analysis module 134 can be configured to access the local data storage 136 or communicate with it via the communication bus 137, so as to transmit the said analytical report to the local data storage 136 for storing thereof. Also, in some embodiments, the prepared or generated analytical report is stored in the separate local analytical report storage (not shown).

Further, according to certain non-limiting embodiments of the present technology, the decision module 135 is configured to connect to the analysis module 134 or to communicate with it via the communication bus 137, so as to receive the log files, prepared or generated by the analysis module 134, therefrom.

The decision module 135 can be configured to (i) analyze the penalties associated with each domain name with the numerical values assigned to it, stored in respective ones of the log files received from the analysis module 134; and (ii) assign each domain name, for which a corresponding log file has been received, to the malicious domain names, if the obtained results of the suspiciousness features analysis are typical of the malicious domain names, or to the trusted domain names, if the results of the suspiciousness features analysis are typical of the trusted domain names. Thus, the decision module 135 takes the final decision or renders the final verdict indicative of whether a given network device having sent the given domain name is compromised or not using the log file created by the analysis module 134 for each domain name extracted.

It should be expressly understood that each one of the communication module 132, the filtering module 133, the analysis module 134, and the decision module 135 can be configured to execute their respective functions described above in real time, that is, the communication module 132 continues to receive the network traffic, the filtering module 133 performs its operations filtering at least a part of the DNS queries extracted from the data packets in the network traffic received based on predetermined types of domain names, the analysis module 134 performs its operations for analyzing domain names and assigning to them the suspiciousness features—penalty values with the subsequent creation of a log file for each domain name individually, and the decision module 135 performs its operations for analyzing at least part of the log files received from the analysis module 134, and storing at least part of the generated or prepared analytical reports in the local data storage 136.

In some embodiments of the present technology, the above functional modules could be separated or combined while maintaining the functions inherent in each module individually. For example, the analysis module 134 and the decision module 135 could be combined, for example, into one module for detecting malicious domain names and, on the basis of them, detecting the compromised network devices 111 of the protected infrastructure, which has all the above functionalities inherent in each of them individually. Alternatively, in the other embodiment of the present technology, the filtering module 133 and the analysis module 134 could be combined, for example, into one module having all of the above functionalities inherent in each of them individually.

In the other embodiment of the present technology, the communication module 132 could be divided into several separate communication modules, where each of them provides wired and/or wireless communication in the computing device 130.

Further, it should be noted that each one of the above-mentioned modules of the computing device can be implemented as a separate electronic device including all or some components of a computing environment 300, described below with reference to FIG. 3. However, in other non-limiting embodiments of the present technology, functionality of at least two of the above-mentioned modules can be executed by a separate electronic device including all or some of the components of the computing environment 300, such as a processor 301. For example, the traffic capture module 131 and the communication module 132 can be implemented as a first separate electronic device. In another example, the filtering, analysis, and decision module 133, 134, and 135 can be implemented as a second electronic device.

In yet other non-limiting embodiments of the present technology, each one of the above-mentioned modules can be implemented in the computing device 130 being a single electronic device and including all or some of the components of the computing environment 300.

Method

Given the architecture described above, it is possible to implement a method for detecting the compromised network devices that are using DNS tunneling. With reference to FIG. 2, there is depicted a flowchart diagram of a method 200, in accordance with certain non-limiting embodiments of the present technology. The method 200 can be executed, for example, by the processor 301 of the computing device 130.

Step 210: Receiving, by the Processor, Traffic of the Network Infrastructure The method 200 commences at step 210 with the processor 301 being configured to receive, from one of the network switch 122 of the protected network infrastructure 110 and the traffic capture module 131, the traffic of the protected network infrastructure 110.

According to certain non-limiting embodiments of the present technology, the traffic of the protected network infrastructure 110 could include one or both outbound traffic and inbound network traffic of the protected network infrastructure 110.

It should be noted that traffic could be received by any method, for example, but not limited to, by the processor 301 applying a traffic mirroring method.

More specifically, the traffic mirroring is executed by duplicating the packets transmitted, for example, through one port of the network switch 112 to another one to be received by the computing device 130. It should be noted that most of modern network switches enable to duplicate traffic using built-in functions. Also, it is additionally possible to use, for example, tcpdump console utility, which is included in most Unix systems and enables to intercept and display network traffic by the traffic capture module 131.

After receiving the traffic from the protected network infrastructure 110, the processor 301 can be configured to store it in the local data storage 136 of the computing device 130, as an example.

The method 200 hence advances to step 220.

Step 220: Identifying, by the Processor, From the Traffic, A Plurality of DNS Queries Having Been Generated by Network DEVICES OF THE NETWORK INFRASTRUCTURE At step 220, according to certain non-limiting embodiments of the present technology, the processor 301 can be configured to identify in the traffic received at step 210, a plurality of DNS queries having been generated by network devices of the protected network infrastructure 110.

To that end, for example, the processor 301 can be configured to apply, to the received traffic, a specifically written parser or network traffic analysis services.

In one example, but not limited to, the following tools could be used by the processor 301 to detect DNS queries: zeek, snort, Suricata, etc. The use of such tools can enable to get a full picture of events on the communication network 120 according to all the most popular protocols: HTTP, DNS, TLS, SMB, FTP, RDP, SSH, ICMP, etc., including industrial protocols s7, iec104, opcua, etc.

In specific non-limiting embodiments of the present technology, the processor 301 can be configured to determine, for a given DNS query of the plurality of DNS queries, at least one of: a domain name; a sender IP address, and a recipient IP address.

Additionally, at step 220, the processor 301 can further be configured to determine if in the local data storage 136, for example, there is any analytical report associated with the domain names identified in the plurality of DNS queries. This could include execution, by the processor 301, of at least one of the following sub-steps: (i) obtaining data on analytical reports; (ii) setting up a correspondence of each of the determined domain names to a respective one of the available analytical reports by conducting a character-by-character comparison of each of the determined domain names with the domain names associated with the available analytical reports. In some non-limiting embodiments of the present technology, in response to an absence of any analytical report for a given determined domain name, the processor 301 can be configured to further analyze the given determined domain name, as will be described below.

By contrast, if the processor 301 has identified, for the given determined domain name, a respective analytical report that includes data indicative of the given determined domain name being benign, or otherwise trustworthy, then all DNS queries including the given determined domain name are removed from further analysis. Otherwise, if the respective analytical report includes data indicative of the given determine domain name being malicious, the processor 301 can further be configured to (i) identify all network devices in the protected network infrastructure 110 having interacted with the identified domain name and (ii) determine a penalty for the identified network devices, as will be described in detail at step 250.

Further, the processor 301 can be configured to store the plurality of DNS queries identified in the traffic in the local data storage 136 in the form of a list including, for each given DNS query, a respective domain name, a respective sender IP address, and a respective recipient IP address.

The method thus proceeds to step 230.

Step 230: Removing, by the Processor, From the Plurality of DNS Queries, the DNS Queries to the Predetermined Types of Domain Names, Thereby Generating a Refined Plurality of DNS Queries At step 230, the processor 301 can be configured to determine, within the plurality of DNS queries, those, transmission of which is non-indicative of the respective network device of the protected network infrastructure 110 being compromised. According to certain non-limiting embodiments of the present technology, such DNS queries can be submitted to predetermined types of domain names.

According to certain non-limiting embodiments of the present technology, the predetermined domain names can include at least one of: second level domain names, low entropy domain names, and domain names having been previously identified as trusted domain names.

Thus, DNS queries associated with the second level domain names are excluded from the plurality of DNS queries. Further, the processor 301 can be configured to store the excluded DNS queries and the domain names thereof in the local data storage 136.

According to certain non-limiting embodiments of the present technology, to identify the second level domains, the processor 301 can be configured to execute: (i) communicating with a data storage, including the local data local 136 or remote trusted domain name storage (not shown) depending on the embodiment, as described above, to obtain therefrom a list of the predetermined domain names, (ii) transforming each domain name into a string and checking the number of dots in this string (iii) depending on whether the number of dots in the string exceeds one (which corresponds to a second level domain name), the domain name is either filtered out and tagged as a trusted domain name, or remains in the list.

It should be noted that the domain name entropy could be referred to the features allowing to determine the use of DNS tunnels. Conventional domain names are generally composed of English words; such names have low entropy. At the same time, the encoded data have high entropy. It is well-known that the DNS tunneling tools encode the data put into the DNS query. Thus, domain names with high entropy could indicate the use of DNS tunneling. In view of this, at step 230, the processor 301 can be configured to filter out DNS queries associated with domain names having low entropy.

It is not limited how the processor 301 can be configured to determine a respective entropy value for the domain names associated with the plurality of DNS queries. By way of example, but not limited to, in some non-limiting embodiments of the present technology, the processor 301 can be configured to determine the respective entropy value based on frequency of occurrence of N-grams in the given domain name.

More specifically, to determine the respective entropy value, the processor 301 can be configured to execute: (i) determining a frequency of occurrence of each one of a plurality of predetermined N-grams in the given domain names, with each N-gram corresponding to a combination of N consecutive characters. N-grams could be obtained from the local data storage 136, or from a wirelessly connected data storage; alternatively, they could be specified by an operator in a specific interface of the computing device 130. Further, the processor 301 can be configured to execute (ii) determining the entropy of N-grams in the given domain name as a function of the frequency of occurrence of each N-gram; (iii) comparing the determined N-gram entropy of the given domain name with a predetermined N-gram entropy threshold value, which is indicative domain names with low entropy; the threshold value could be predetermined empirically; and (iv) filtering out (excluding) domain names, whose entropy is below the predetermined N-gram entropy threshold value.

Also, the processor 301 can be configured to remove from further analysis the previously identified trusted domain names. To that end, the processor 301 can be configured to execute: (i) communicating with a data storage, including the local data storage 136 or the remote trusted domain name storage (not shown) depending on the embodiment, as described above to obtain a set of domain names therefrom, (ii) determining a match of each of the determined domain names with a respective one of the previously identified domain names by character-by-character comparison therebetween, and (iii) depending on the matching result, the DNS queries associated with the analyzed domain names are either filtered out and tagged as a trusted domain name, or it remain in the plurality of DNS queries for further analysis.

Alternatively, in additional non-limiting embodiments of the present technology, the step of filtering the DNS queries described above can be omitted by the processor 301.

In some additional embodiments of the present technology, domain names could also be encoded by any method to support the localized domain names, i.e., domain names that are composed not of Latin characters, but of other national alphabet characters, such as, for example, доменное.имя. на.русском.рф (that means domain.name.in.russian.rf).

In some non-limiting embodiments of the present technology, if the processor 301 has identified the given domain name in the local data storage 136 or in a trusted database accessed over the communication network 120, then the method 200 proceeds to step 260.

In some non-limiting embodiments of the present technology, the processor 301 can be configured to additionally determine if at least one respective sender IP address and/or respective recipient IP address are present in reliable sources or in one of the whitelist and blacklist stored in the local data storage 136. This could be done by the method described above for checking domain names. Further, depending on the matching result, the processor 301 can be configured to either filter out and tag the given domain name as a trusted domain name, or proceed to the next step, described below, or block it if it is present in the blacklist or in a database of, for example, web resources that knowingly belong to cyber-criminals.

Thus, after removing the DNS queries to the predetermined domain names from the plurality of DNS queries identified at step 220, as described above, the processor 301 can be configured to generate a refined plurality of DNS queries for further analysis as will be described below.

The method 200 hence advances to step 240.

Step 240: Generating, by the Processor, for a Given One of the Refined Plurality of DNS Queries, a Respective Set of Features; Applying, by the Processor, to the Respective Set of Features Associated With the Given One of the Refined Plurality of DNS Queries, a Pre-Trained Decision Rule At step 240, according to certain non-limiting embodiments of the present technology, the processor 301 can be configured to determine, for a given one of the refined plurality of DNS queries, a respective set of features, to which the processor 301 can further be configured to apply a decision rule, pre-trained to determine whether a domain name associated with the given one of the refined plurality of DNS queries is malicious or not. As mentioned above, according to certain non-limiting embodiments of the present technology, the pre-trained decision rule can be based on one of heuristic and statistical algorithms, and MLAs.

According to certain non-limiting embodiments of the present technology, a heuristic-based pre-trained decision rule could be a division of domains by the entropy level so that domains with high level of entropy are considered suspicious. Moreover, the entropy threshold level can be determined empirically. Approaches based on selection of N-grams and subsequent computing their entropy with further comparison of the determined entropy levels with the predetermined entropy level threshold value as described above are also envisioned.

Also, in some non-limiting embodiments of the present technology, several heuristic approaches can be used in parallel as a single pre-trained decision rule and their results are brought to a single binary assessment, that is, the decision could be one of two options: domain name is malicious or not. In this case, the processor 301 can be configured to assign a reliability coefficient to each heuristic approach used in the pre-trained decision rule and further obtain the final assessment of a domain suspiciousness based on these coefficients.

Also, in other non-limiting embodiments of the present technology, the processor 301 can be configured to apply the pre-trained decision rule being based on an MLA including, without limitation, NNs, decision trees, boosting algorithms, and signatures, as an example.

In specific non-limiting embodiments of the present technology, the pre-trained decision rule can be based on an LSTM NN. Broadly speaking, LSTM NNs are a type of the recurrent neural network family, RNNs, and they enable to analyze dependencies in a data sequence over multiple training iterations.

As an input feature vector, according to certain non-limiting embodiments of the present technology, the LSTM NN can be configured to use vector representations of the input domain name prefix symbols. In this embodiment, a prefix is considered to be a part of the given domain name including subdomains of the third and higher levels. For example, for aaaa.drive.google.com domain, the prefix is the "aaaa.drive".

In some non-limiting embodiments of the present technology, domain name prefix could be determined by any method. For example, the processor 301 can be configured to apply, to the given domain name, a specially written script could, at implementation of which, firstly a generic top-level domain (gTLD) and/or a country code top-level domain (ccTLD), which are generic top-level domains, are selected. For example, in the URL xyz.example.com/doc.html, the 'example.com' string is a second level domain and .com is a generic top-level domain (gTLD). Likewise, in example.ac.ru the example.ac.ru is a generic second level domain, and .ru is a country code TLD (ccTLD). Then, a subdomain of a lower level is selected and also excluded from the prefix.

As a non-limiting example, the specially written script for identifying the prefix of the given domain name can be developed in Python using the 'tldextract' library, which uses domain suffix references, including the PUBLIC SUFFIX LIST (publicsuffix.org). A simplified version of the obtained results of the specified script execution is presented below:

tldextract.extract('forums.news.cnn.com/')
ExtractResult (subdomain='forums.news', domain='cnn', suffix='com').

It should be noted that in addition to vector representation of the domain name prefix, the respective feature vector can further include values representative of networking statistics collected during last T minutes from the network device sent the given DNS query, including a penalty value associated with the network device.

In the context of this specification, the networking statistics include the number of interactions according to the above protocols for the last T minutes, and for the protocols above TCP this is the number of sessions, and for UDP protocols this is the number of datagrams.

In different embodiments, the number of T minutes could be manually set by an expert or user of the computing device 130, or could be set automatically, for example, depending on the number of network devices in the protected network infrastructure 110, and can include, for example, 1 minute, 2 minutes, or even 5 minutes.

It should be noted that, according to certain non-limiting embodiments of the present technology, the built-in NN can function with zero statistics parameters also, however, T is assumed to be small, i.e., by way of example, but not limited to, 10 minutes, respectively, these statistics will appear quickly.

As for the penalty value of the at least one user device 111 of then protected network infrastructure 110, according to certain non-limiting embodiments of the present technology, it can initially be set to zero, and it can further change with the number of iterations in the system 100 as will be described in more detail below. In this case, all intermediate values of penalties are stored in the local data storage 136.

In some embodiments of the present technology, training digital objects for training the LSTM NN could be generated, for example, by the processor 301, based on training feature vectors determined for training domain names, both in an isolated stand and in "field" conditions, within an operating and high-load network using certain methods for building DNS tunnels. For example, such methods may include, without limitation, the use of special utilities, such as NameServer (NSTX), Dns2tcp, Iodine, dnscat2, etc.

In some non-limiting embodiments of the present technology, the processor 301 can be configured to normalize and/or reduce the dimensionality of each feature vector by a first layer of the LSTM NN by any approach. As an example of the procedure for normalizing the feature space, there could be the fact that all identified domains are added to the length of 256 with special characters on the right.

After this layer the next one is the first learning layer of the LSTM with empirically derived coefficients. These coefficients are determined at the training phase of the LSTM NN, when tagged training digital objects including respective training feature vectors of training domain names are fed into the LSTM NN, i.e., those for which the verdict is known in advance, i.e. the fact of their belonging to malicious or non-malicious domain names. It should be noted that the said training digital objects could be obtained both from external trusted sources and by empirical method, for example, by manual activation of "maliciousness" flag for malicious domain names. Besides, the above data are also enriched with legitimate tagged domain names. In other words, the processor 301 can be configured to receive, at the training phase, both training digital objects including training feature vectors determined for both tagged malicious and legitimate domain names. Further, by feeding such training digital objects to the LSTM NN, the processor 301 can be configured to train the LSTM NN, thereby determining coefficients (or otherwise "weights") for the nodes thereof, which are further used in an in-use phase for classification (prediction) of to in-use domain names determined for each one of the refined plurality of DNS queries, as an example.

The next layer of the LSTM NN clears the results of the previous layer operation to obtain more reliable results. It is not limited which clearing technique is used and can include, for example, discarding a part of extreme (maximum and minimum) values obtained during the analysis, for example, 25% per both.

Further, according to certain non-limiting embodiments of the present technology, the clearing layer is followed by two additional intermediate layers that enable the LSTM NN to select longer dependency chains as features. It has been empirically established that this number of inner layers gives the required balance of operation speed and errors. The last layer of the LSTM NN can be configured to generate a binary verdict, indicative of whether the given domain name is malicious or not.

Thus, the processor 301 can be configured to apply the pre-trained decision rule to the given one of the refined plurality of DNS queries to determine if the domain name associated therewith is malicious or not.

The method 200 hence advances to step 250.

Step 250: In Response to the Pre-Trained Decision Rule Rendering a Positive Outcome, Increasing a Respective Penalty Score for Each Network Device of the Network Infrastructure Having Transmitted the Given One of the Refined Plurality of DNS Queries At step 250, based on the verdict rendered by the pre-trained decision rule for the given DNS query of the refined plurality of DNS queries, the processor 301 can be configured to determine whether a respective network device having transmitted the given DNS query is compromised or not.

To that end, first, the processor 301 can be configured to determine, if the verdict rendered by the pre-trained decision rule is indicative of the domain name associated with the given DNS query is malicious or not. For example, if the verdict is indicative of the domain name being malicious, the processor 301 can be configured to increase the penalty value for the respective network device (such as the at least one user device 111) of the protected network infrastructure 110 having sent the given DNS query.

In additional non-limiting embodiments of the present technology, the processor 301 can further be configured to identify the domain name associated with the given DNS query in the history of all inbound and outbound traffic received from the protected network infrastructure 110. Also, it should be noted that not only DNS queries are being considered. For example, the processor 301 can be configured to similarly analyze other entries of the domain name, and then penalize all network devices of the protected network infrastructure 110 communicating with this domain name. In some non-limiting embodiments of the present technology, the processor 301 can be configured to penalize the network devices having communicated with the malicious domain name if they have not been penalized during the last detection.

In additional non-limiting embodiments of the present technology, the processor 301 can be configured to execute at least one of (i) blocking the malicious domain name detected for the entire protected network infrastructure 110, (ii) generating notifications (alerts), notifying the interested parties of an incident or display a corresponding notifications, (iii) adding the malicious domain name detected to the blacklists accessible for the computing device 130 over the communication network, etc.

In additional non-limiting embodiments of the present technology, the processor 301 can further be configured to extract, from the local data storage 136, at least one sender IP address and/or recipient IP address associated with the malicious domain name, to identify in the local data storage 136 at least one additional domain name located at the same extracted IP address, and also to identify all the network devices of the protected network infrastructure 110 communicating with the at least one additional identified domain name. Further, the processor 301 can be configured to increase respective penalty values of those network devices having communicated with the at least one additional identified domain name.

It should be noted that the processor 301 can also be configured to update the blacklist (a list of malicious domain names), which is used at the filtering step 230 to reduce processing time and render a verdict on a similar DNS query without applying the pre-trained decision rule thereto.

The method 200 thus proceeds to step 260.

Step 260: In Response to the Respective Penalty Score Associated With a Given Network Device Exceeding a Predetermined Penalty Score Threshold, Identifying, by the Processor, the Given Network Device as Being Compromised; and Generating, by the Processor, a Warning Notification for Transmission Thereof About the Given Network Device Being Compromised At step 260, according to certain non-limiting embodiments of the present technology, the processor 301 can be configured to determine if the penalty value of the respective network device having sent the given DNS query associated with the malicious domain name exceeds a predetermined penalty value threshold. If so, the processor 301 can be configured to determine that the respective network device is compromised and can further be configured to generate a corresponding warning notification, for example, for a user of the respective network device being compromised.

In certain non-limiting embodiments of the present technology, predetermined penalty value threshold can be selected empirically, based on statistics of device compromise, frequency of interaction with malicious domain names, and so on.

In additional non-limiting embodiments of the present technology, the processor 301 can further be configured to determine all contacts (interactions) of the detected compromised network device inside the protected network infrastructure 110. Also, special attention can be paid to the remote-control protocols. In case of a large number of such interactions, for example, such as remote application launching, accessing the shared resources, etc., when interacting with any other network device, the detected compromised network device can further be penalized and then checked for penalty exceeding the compromise threshold value.

It should also be noted that implementation of the method 200 is also possible in specific networks. The method 200 can be especially effective in the networks with strict security policies. For example, in a network of video cameras, interactions over all network protocols, except for the protocol required for video transmission, would most likely be disabled. DNS protocol is required to provide routing on a network and is generally allowed even on such networks. In this case, it is highly likely that malefactors will use namely DNS as transport for data exfiltration.

The method 200 hence terminates.

Computing Environment

Figure 3:
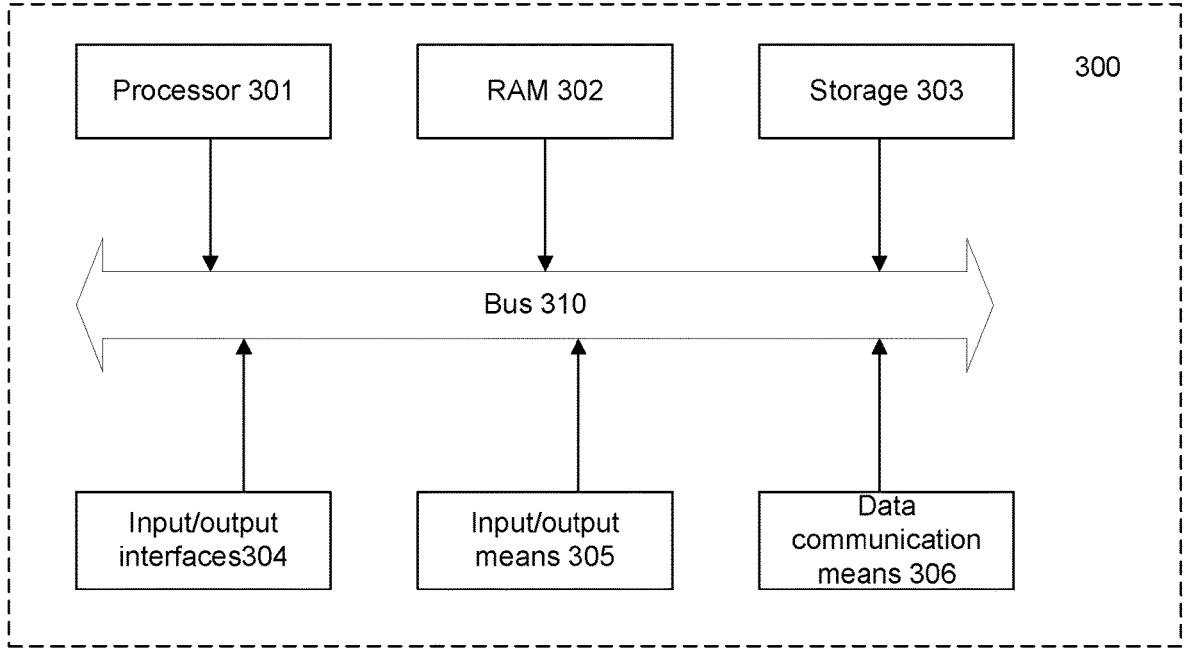
FIG. 3 depicts a schematic diagram of an example computing environment configurable for execution of the present methods of FIG. 2, in accordance with certain non-limiting embodiments of the present technology.

With reference to FIG. 3, there is depicted an example functional diagram of the computing environment 300 configurable to implement certain non-limiting embodiments of the present technology including the method 200 described above.

In some non-limiting embodiments of the present technology, the computing environment 300 may include: the processor 301 comprising one or more central processing units (CPUs), at least one non-transitory computer-readable memory 302 (RAM), a storage 303, input/output interfaces 304, input/output means 305, data communication means 306.

According to some non-limiting embodiments of the present technology, the processor 301 may be configured to execute specific program instructions the computations as required for the computing environment 300 to function properly or to ensure the functioning of one or more of its components. The processor 301 may further be configured to execute specific machine-readable instructions stored in the at least one non-transitory computer-readable memory 302, for example, those causing the computing environment 300 to execute the method 200.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures, and other software elements.

The at least one non-transitory computer-readable memory 302 may be implemented as RAM and contains the necessary program logic to provide the requisite functionality.

The storage 303 may be implemented as at least one of an HDD drive, an SSD drive, a RAID array, a network storage, a flash memory, an optical drive (such as CD, DVD, MD, Blu-ray), etc. The storage 303 may be configured for long-term storage of various data, e.g., the aforementioned documents with user data sets, databases with the time intervals measured for each user, user IDs, etc.

The input/output interfaces 304 may comprise various interfaces, such as at least one of USB, RS232, RJ45, LPT, COM, HDMI, PS/2, Lightning, FireWire, etc.

The input/output means 305 may include at least one of a keyboard, joystick, (touchscreen) display, projector, touch-pad, mouse, trackball, stylus, speakers, microphone, and the like. A communication link between each one of the input/output means 305 can be wired (for example, connecting the keyboard via a PS/2 or USB port on the chassis of the desktop PC) or wireless (for example, via a wireless link, e.g., radio link, to the base station, which is directly connected to the PC, e.g., to a USB port).

The data communication means 306 may be selected based on a particular implementation of the communication network 120 and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 300 may be linked together using a common data bus 310.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implementable method of identifying, in a network infrastructure, compromised network devices that are using DNS tunneling, the computer-implementable method being executable by a computing device located within the network infrastructure, the computing device including at least one processor, the computer-implementable method comprising:

receiving, by the at least one processor, traffic generated by each network device of a plurality of network devices located within the network infrastructure;

identifying, by the at least one processor, from the traffic, a plurality of DNS queries having been generated by respective network devices of the plurality of network devices located within the network infrastructure, each one of the plurality of DNS queries having been transmitted outside the network infrastructure;

determining, by the at least one processor, in the plurality of DNS queries, presence of DNS queries to predetermined types of domain names, generation of which, by a respective network device of the network infrastructure, is non-indicative of the respective network device being compromised, the predetermined types of domain names including at least low entropy domain names;

removing, by the at least one processor, from the plurality of DNS queries, the DNS queries to the predetermined types of domain names, thereby generating a refined plurality of DNS queries;

generating, by the at least one processor, for a given one of the refined plurality of DNS queries, a respective set of suspiciousness features, the respective set of suspiciousness features comprising:

statistics of network interactions of the respective network device having transmitted the given one of the refined plurality of DNS queries, the statistics of network interactions including: (i) for protocols above a Transmission Control Protocol (TCP), a number of TCP sessions; and (ii) for User Datagram Protocol (UDP), a number of datagrams over a predetermined period after the respective network device most recently sent the given one of the refined plurality of DNS queries;

applying, by the at least one processor, to the respective set of suspiciousness features associated with the given one of the refined plurality of DNS queries, a pre-trained decision rule, the pre-trained decision rule having been trained to determine, based on the respective set of suspiciousness features, whether a respective domain name associated with the given one of the refined plurality of DNS queries is malicious;

in response to the pre-trained decision rule rendering a positive outcome, increasing a respective penalty score for each network device of the network infrastructure having transmitted the given one of the refined plurality of DNS queries;

in response to the respective penalty score associated with a given network device exceeding a predetermined penalty score threshold, identifying, by the at least one processor, the given network device as being compromised; and generating, by the at least one processor, a warning notification for transmission thereof about the given network device being compromised.

2. The computer-implementable method of claim 1, wherein the traffic of the network infrastructure comprises at least one of inbound traffic and outbound traffic.

3. The computer-implementable method of claim 1, wherein the receiving the traffic comprises applying, by the at least one processor, a traffic mirroring approach.

4. The computer-implementable method of claim 1, wherein the determining, in the plurality of DNS queries, the presence of the DNS queries to the predetermined types of domain names comprises determining, for each one of the plurality of DNS queries, at least one of: a domain name; a sender IP address, and a recipient IP address.

5. The computer-implementable method of claim 4, further comprising determining whether at least one recipient IP address is in one of a blacklist and in a whitelist, and in response to the at least one recipient IP address being in the blacklist, increasing the penalty score for each network device of the network infrastructure having transmitted a respective DNS query including the at least one recipient IP address;

in response to at least one recipient IP address being in the whitelist, identifying the respective DNS query as being one of the DNS queries to the predetermined types of domain names.

6. The computer-implemented method of claim 1, wherein the predetermined types of domain names further include:
second level domain names and
domain names having been identified as trusted domain names.

7. The computer-implemented method of claim 1, wherein the pre-trained decision rule comprises at least one of (i) a heuristic rule and (ii) a long short-term memory (LSTM) neural network-based rule,
the LSTM neural network-based rule having been determined by a LSTM neural network trained to determine, based on the respective set of suspiciousness features, whether the respective domain name associated with the given one of the refined plurality of DNS queries is malicious.

8. The computer-implemented method of claim 7, wherein applying the heuristic rule comprises:
determining, by the at least one processor, for the respective domain name of the given one of the refined plurality of DNS queries, a respective entropy value; and
in response to the respective entropy value being greater than a predetermined entropy value threshold, determining that the respective domain name associated with the given one of the refined plurality of DNS queries is malicious.

9. The computer-implemented method of claim 7, wherein applying the heuristic rule comprises:
determining, by the at least one processor, a respective frequency of occurrence, in the respective domain name, of each one of a plurality of predetermined N-grams;
based on respective frequency values, determining an N-gram entropy value for the respective domain name; and
in response to the N-gram entropy value exceeding a predetermined N-gram entropy threshold value, determining that the respective domain name associated with the given one of the refined plurality of DNS queries is malicious.

10. The computer-implemented method of claim 7, wherein applying the LSTM neural network-based rule comprises feeding, by the at least one processor, to the LSTM neural network: (i) the respective set of suspiciousness features associated with the given one of the refined plurality of DNS queries; (ii) the statistics of network interactions of the respective network device having transmitted the given one of the refined plurality of DNS queries; and (iii) a current penalty score of the respective network device.

11. The computer-implemented method of claim 1, wherein, in response to the pre-trained decision rule rendering the positive outcome, the method further comprises:
determining, by the at least one processor, in past traffic of the network infrastructure, whether there is at least one other network device having transmitted a DNS query including the respective domain name of the given one of the refined plurality of DNS queries;
in response to determining the at least one other network device, executing one of:
increasing the respective penalty score of the at least one other network device; and increasing respective penalty scores of each network device of the network infrastructure.

12. The computer-implemented method of claim 1, wherein, in response to the pre-trained decision rule rendering the positive outcome, the method further comprises:
restricting, by the at least one processor, access to the respective domain name of the given one of the refined plurality of DNS queries, for every network device included into the network infrastructure;
generating, by the at least one processor, a notification of the respective domain name being malicious;
generating, by the at least one processor, a template email for notifying interested parties about the respective domain name being malicious; and
adding the respective domain name to a blacklist of domain names.

13. A computing device for identifying, in a network infrastructure, compromised network devices that are using DNS tunneling, the computing device being located within the network infrastructure, the computing device comprising at least one processor communicatively coupled to the network infrastructure and a non-transitory computer-readable memory storing instructions, the at least one processor, upon executing the instructions, being configured to:
receive traffic generated by each network device of a plurality of network devices located within the network infrastructure;
identify, from the traffic, a plurality of DNS queries having been generated by respective network devices of the plurality of network devices located within the network infrastructure,
each one of the plurality DNS queries having been transmitted outside the network infrastructure;
determine, in the plurality of DNS queries, presence of DNS queries to predetermined types of domain names, generation of which, by a respective network device of the network infrastructure, is non-indicative of the respective network device being compromised,
the predetermined types of domain names including at least low entropy domain names;
remove, from the plurality of DNS queries, the DNS queries to the predetermined types of domain names, thereby generating a refined plurality of DNS queries;
generate, for a given one of the refined plurality of DNS queries, a respective set of suspiciousness features, the respective set of suspiciousness features comprising:
statistics of network interactions of the respective network device having transmitted the given one of the refined plurality of DNS queries,
the statistics of network interactions including: (i) for protocols above a Transmission Control Protocol (TCP), a number of TCP sessions; and (ii) for User Datagram Protocol (UDP), a number of datagrams over a predetermined period after the respective network device most recently sent the given one of the refined plurality of DNS queries;
apply, to the respective set of suspiciousness features associated with the given one of the refined plurality of DNS queries, a pre-trained decision rule,
the pre-trained decision rule having been trained to determine, based on the respective set of suspiciousness features, whether a respective domain name associated with the given one of the refined plurality of DNS queries is malicious;
in response to the pre-trained decision rule rendering a positive outcome, increase a respective penalty score for each network device of the network infrastructure having transmitted the given one of the refined plurality of DNS queries;

in response to the respective penalty score associated with a given network device exceeding a predetermined penalty score threshold, identify the given network device as being compromised; and generate a warning notification for transmission thereof about the given network device being compromised.

* * * * *